United States Patent
Strassel

(10) Patent No.: US 6,524,686 B2
(45) Date of Patent: *Feb. 25, 2003

(54) COMPLEX MATERIAL WITH IMPROVED PROPERTIES, CONSISTING OF POLYVINYLIDENE FLUORIDE AND OF AN INCOMPATIBLE THERMOPLASTIC

(75) Inventor: Albert Strassel, Oullins (FR)

(73) Assignee: Atofina, Paris (FR)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/621,401

(22) Filed: Mar. 25, 1996

(65) Prior Publication Data

US 2002/0068175 A1 Jun. 6, 2002

(30) Foreign Application Priority Data

Mar. 24, 1995 (FR) .............................. 95 03497

(51) Int. Cl.⁷ .................. B32B 27/30; B32B 27/20; B32B 27/08
(52) U.S. Cl. ................. 428/215; 428/220; 428/354; 428/421; 428/422
(58) Field of Search ................ 428/220, 354, 428/421, 422, 215

(56) References Cited

U.S. PATENT DOCUMENTS

| | | | | |
|---|---|---|---|---|
| 4,364,886 A | * | 12/1982 | Strassel | 264/171 |
| 4,444,826 A | * | 4/1984 | Sasaki | 428/421 |
| 4,824,728 A | | 4/1989 | Parsons | 428/421 |
| 5,242,976 A | * | 9/1993 | Strassel | 525/72 |

FOREIGN PATENT DOCUMENTS

| | | | |
|---|---|---|---|
| EP | A 0 060 421 | | 9/1982 |
| GB | 1578517 | * | 11/1980 |
| JP | 008350 | * | 1/1986 |
| JP | A-61 008 349 | | 1/1986 |
| WO | WO-A-89 00499 | | 1/1989 |

* cited by examiner

Primary Examiner—David J. Buttner
(74) Attorney, Agent, or Firm—Pennie & Edmonds LLP

(57) ABSTRACT

The invention relates to an article containing at least three layers, which is intended to adhere to a polymer incompatible with polyvinylidine fluoride (PVDF). The article comprises at least one layer of PVDF, at least one layer of PVDF rendered opaque to UV and visible radiation, and a composition for adhesion of the PVDF to an incompatible thermoplastic. The three-layer complex may be obtained by coextrusion. The three-layer complex is generally intended to form, with a PVDF-incompatible thermoplastic material, a novel 4-layer integral complex, either by coextrusion or by hot-pressing.

17 Claims, No Drawings

COMPLEX MATERIAL WITH IMPROVED PROPERTIES, CONSISTING OF POLYVINYLIDENE FLUORIDE AND OF AN INCOMPATIBLE THERMOPLASTIC

French patents FR 2,577,564, FR 2,577,168, FR 2,415,000, FR 2,436,676 and FR 2,659,085 describe coextrudable polyvinylidene fluoride (PVDF) compositions which make it possible to make it adhere to thermoplastic resins with which it is not compatible. The complexes are obtained by coextrusion.

In this manner, it is possible, for example, to coextrude PVDF with the composition intended to make it adhere to the PVDF-incompatible polymer, and then to apply this complex to the incompatible polymer or alternatively to directly coextrude the three layers: PVDF/composition necessary for adhesion/PVDF-incompatible polymer.

Such complexes are advantageous insofar as their structure is homogeneous or integral, in contrast with heterogeneous complexes such as, for example, multilayer materials in which the layers are adhesively bonded together and in which the interfaces are not interpenetrated. Within the context of these inventions, which form the subject of the abovementioned patents, mutual interdiffusions of the polymers are demonstrated, thereby leading to a structure which is not discontinuous (as in the bonded assembly), but to a continuity within the material which will be referred to as an integral complex.

In a system such as that described in the patents mentioned above, the PVDF is in contact with an adhesion binder with which it is coextruded. Once applied to the PVDF-incompatible polymer, either by coextrusion or by hot-pressing, this binder can ensure adhesion between PVDF and incompatible polymer only insofar as it is not degraded during the use of the complex. There are many reasons for degradation:hydrolysis, attack by solvents or other chemical products, degradation by photo-oxidation.

The subject of the present invention thus relates to an integral complex containing at least three layers, which is intended to adhere to a PVDF-incompatible polymer. A second subject of the invention relates to the three-layer complexes coextruded directly with the PVDF-incompatible polymer or polymers. The invention also relates to the process for the manufacture of the three-layer integral complex, this three-layer complex being declared integral as opposed to the same three layers which would have been adhesively bonded and which do not have this continuous structure.

More precisely, the invention firstly relates to an integral complex comprising at least three layers consisting respectively of PVDF, of PVDF rendered opaque to UV and visible radiation, and of a composition which allows adhesion of the PVDF to a PVDF-incompatible thermoplastic polymer.

This complex is capable of protecting the adhesion composition from external attacks.

The expression external attacks is understood to denote in particular the actions of water, chemical products, solvents, gases and radiation in the UV and visible ranges.

The integral and homogeneous complexes forming the subject of the invention have improved longevity with respect to chemical and atmospheric agents, coupled with surface properties which are superior to those of all the other existing complexes.

It is easy to understand that, in the processes mentioned above, a pure PVDF at the surface was incapable by itself of providing the adhesion binder with UV protection, since it is itself UV-permeable. Although, admittedly, it is possible to incorporate organic anti-UV agents into the PVDF, these agents, which are incompatible with the PVDF matrix, migrate to the surface and disappear rapidly, by leaching with water for example, and, in any case, cease to function themselves after a certain period of time. Another way of proceeding consists in incorporating fillers and pigments which act as a UV barrier. It is observed in this case that the essential properties of the PVDF are sacrificed, and in particular its impermeability to liquids and gases. This loss of impermeability is, in this case, the cause of attack of the adhesion binder, and the adhesion is seen to disappear due to hydrolysis and oxidation, if not by solvent attack.

Moreover, the presence of fillers and pigments in the PVDF leads to a microporosity of the latter, which removes the non-stainability, anti-soiling and anti-graffiti qualities therefrom.

Furthermore, this permeability has the effect of allowing various products added to the adhesion binder or to the incompatible substrate to migrate to the surface of the PVDF layer, these products and the degradation products thereof forming a screen between the external agents (UV, $O_2$, $H_2O$, etc.) and the surface of the PVDF.

All of these drawbacks are eliminated in the three-layer integral complex which forms the subject of the invention.

This complex is generally intended to form, with a PVDF-incompatible material, a novel 4-layer integral complex, either by coextrusion or by hot-pressing.

Among the PVDF-incompatible polymers which may be mentioned in particular are the chloro vinyl polymers such as the polyvinyl chloride or the polyvinylidene chloride, the styrene polymers such as the polystyrene or impact polystyrene, the polycarbonates, the polyurethanes, the grafted styrene-acrylonitrile-acrylic elastomers copolymers, the acrylonitrile-butadiene-styrene copolymers, the polyamides, the polyether (block) amides, the polyolefins such as polyethylene or polypropylene or copolymers thereof, the polyphenylene ethers (PPE) and particularly their alloys with polystyrene and/or polyamide. The expression PVDF-incompatible polymer is also understood to refer to mixtures of these polymers, as well as these polymers or mixtures containing fillers, plasticizers or stabilizers.

It goes without saying that the layer of incompatible polymer may itself be associated in any manner with another polymer, a metal and/or a fabric.

As PVDF which may be used in the invention, it will be preferred to use a PVDF homopolymer, but also included under this name are copolymers containing at least 70% by weight of residues of vinylidene fluoride molecules and mixtures thereof with the homopolymer, as well as mixtures of PVDF and/or PVDF copolymer with poly($C_1$14 $C_4$)alkyl methacrylate and/or poly($C_1$–$C_4$)alkyl ethylacrylate containing at least 60% by weight of PVDF homo- or copolymer.

For the requirements of the invention, the three-layer integral complex will include at the surface a PVDF layer as defined above, containing not more than 5% by weight of fillers or pigments or other additive. Preferably, this will be a pure PVDF homopolymer, without additives, pigments or fillers.

This layer will have a light transmission such that the absorption of photons of wavelength 800 nm, measured by spectrophotometry equipped with an integration sphere on a film 50 μm in thickness, is preferably less than 70%.

Fillers, pigments, UV-absorbing agents or UV-stabilizing agents, plasticizers, etc. necessary to obtain the opacity to UV and visible rays will be added to the second layer of PVDF. This second layer will have a light transmission such that the absorption of photons of wavelengths between 200 and 800 nm, measured by spectrophotometry equipped with an integration sphere on a film 50 μm in thickness, is preferably greater than 90%.

By way of illustration of additives which render the PVDF opaque to UV and visible rays, mention will be made in particular of titanium oxide, zinc oxide, carbon black, antimony oxide, inorganic or organic pigments, and benzophenone-based UV-absorbing agents.

By way of illustration of adhesion compositions of the third layer, reference may be made to the compositions described in the five patents mentioned above, which are incorporated here by way of reference.

Among these compositions, mention may be made in particular of compositions based on polyalkyl methacrylate, on polyurethane or alternatively on ethylene/CO polymer.

The respective thicknesses of these three layers will preferably be:

1st layer between 10 μm and 300 μm,
2nd layer between 10 μm and 300 μm,
3rd layer between 10 μm and 200 μm.

It will be possible for these three layers to be coextruded according to the usual techniques for the coextrusion of films, sheets and plates (as described in the patents mentioned).

It goes without saying that the subject of the invention is not limited to the coextrusion of this three-layer integral complex, but that it is extended to the one-stage coextrusion of this triple layer with the PVDF-incompatible polymer, as well as to the complexes which the hot-pressed three-layer complex forms with the PVDF-incompatible polymer, according to the standard techniques of coextrusion and of hot bonding.

The invention relates also to the complexes formed by the three-layer complex bound or hot-pressed with metallic substrates such as steel or aluminium, wood-based substrates and/or fabrics.

Lastly, also forming part of the invention is the production of a PVDF-incompatible polymer complex in which at least one face is protected by at least the three-layer integral complex, it being possible for the others to be protected by, besides this triple layer, a double layer which forms the subject of the patents mentioned above, or by another material which protects the PVDF-incompatible polymer.

The examples which follow illustrate the invention.

EXAMPLES 1 AND 2 AND COMPARATIVE EXAMPLES 1c and 2c

Plates having the composition shown below are coextruded using the conventional coextrusion material containing four extruders and a multilayer die in which the four flows of material become superimposed on one another slightly in front of the lips of the die:

1st layer: PVDF homopolymer of fluidity 2.2 to 2.5 g/10 min at 230° C. under 5 kg according to ISO 1133 (Kynar 1000 HD® from Elf Atochem), pure or containing a pearlescent pigment, 2nd layer: PVDF homopolymer of fluidity 4.5 g to 5 g/10 min at 230° C. under 5 kg according to ISO 1133 (Kynar 4000 HD® from Elf Atochem), which may or may not contain fillers, 3rd layer: Adhesion binder of composition by weight:

35 PMMA (Altulite 2654®) (polymethyl methacrylate and polyethyl methacrylate of apparent viscosity at 200° C. of 6900 Pa s at the rate gradient 3.54/s), 30 PVDF (Kynar 4000®), 35 methacrylate grafted butadiene-styrene elastomer (Paraloid KM 323 B®), 4th layer: ABS (Cycolax X 399®) of apparent viscosity at 200° C. of 15700 Pa s at the rate gradient 3.54/s.

The respective thicknesses of the four layers are: 50 μm, 50 μm, 30 μm, 4 mm.

In the examples below, only the compositions of layers 1 and 2 are varied. The resistance to ageing by irradiation for 500 h at 60° C. in an accelerated photo-ageing chamber of type Sepap 12-24 is measured. After ageing, tests of adhesion by peeling and of resilience are carried out according to the Dynstat method on a notchless bar, the face which has received the radiation being stretched. Possible changes in colour are also noted.

For each layer 1 and 2, the absorption of photons on a film 50 μm in thickness was measured.

| Ex. | Compositions of the layers | Light absorption at 800 nm measured on a 50 μm film | Adhesion* N/m | Resilience as a % of the value before ageing | Coloration |
|---|---|---|---|---|---|
| 1 | Layer 1: | | | | |
| | Transparent Kynar | 10% | | | |
| | Layer 2: | | | | |
| | Kynar with 15% ZnO | 100% | >2200 | 100% | White residue |
| 1c | Layer 1: | | | | |
| | Transparent Kynar | 10% | | | |
| | Layer 2: | | | | |
| | Kynar with 1% pearlescent pigment (1) | 40% | 1200 | 50% | Yellowing |
| 2 | Layer 1: | | | | |
| | Kynar + 2% pearlescent pigment (1) | 60% | | | |
| | Layer2: | | | | |
| | Kynar with 15% ZnO | 100% | >2500 | 100% | White residue |

-continued

| Ex. | Compositions of the layers | Light absorption at 800 nm measured on a 50 μm film | Adhesion* N/m | Resilience as a % of the value before ageing | Coloration |
|---|---|---|---|---|---|
| 2c | Layer 1: | | | | |
| | Kynar + 2% pearlescent pigment (1) | 60% | | | Browning |
| | Layer2: | | | | |
| | Transparent Kynar | 10% | 1100 | 30% | |

*Adhesion to 25 × 180 mm test pieces-draw rate 250 mm/min.
Energy: W = (Resistance)/(peel front width) expressed in newtons per meter
(1) Iriodin 103 ® from Merck

EXAMPLES 3 AND 4 AND COMPARATIVE EXAMPLES 3c AND 4c

The following three-layer film is coextruded:

1st layer: PVDF homopolymer (Kynar 4000® from Elf Atochem),

2nd layer: Vinylidene fluoride/trifluorochloroethylene PVDF copolymer (90/10 by weight) of fluidity 3.5 to 4.5 g/10 min at 230° C. under 5 kg according to ISO 1133 (Kynar 5050® from Elf Atochem), 3rd layer: The adhesion binder of Example 1

Respective thicknesses: 100 μm, 80 μm, 50 μm.

This film is obtained by coextrusion-blowing using standard equipment consisting of three extruders and an extrusion-blowing die. A flexible film 230 μm in thickness is obtained.

This film is applied while hot and under pressure between the cylinders of a calender, heated to 130° C., which receives the molten mass of titanium oxide-charged PVC at the extruder outlet. At the calender outlet, a white PVC plate coated with a three-layer film is obtained. The plate is 3 mm thick in total.

| Ex. | Composition of the layers | Light absorption at 800 nm measured on a 50 μm film | Coloration | Adhesion N/m |
|---|---|---|---|---|
| 3c | Layer 1: Natural Kynar | 10% | | |
| | Layer 2: Kynar + 15% ZnO | 100% | White residue | 2000 |
| 3c | Layer 1 and Layer 2: Natural Kynar | 10% | Changed from white to black | 300 |
| 4 | Layer 1: Kynar and 2% pearlescent pigment (1) | 60% | Pearlescent white residue | 2300 |
| | Layer 2: Kynar + 15% ZnO | 100% | | |

| Ex. | Composition of the layers | Light absorption at 800 nm measured on a 50 μm film | Coloration | Adhesion N/m |
|---|---|---|---|---|
| 4c | Layer 1: Kynar and + 2% pearlescent pigment (1) | 60% | Changed from white to brown | 350 |
| | Layer 2: Natural Kynar | 10% | | |

(1) Iriodin 103 ® from Merck

Definitions

A material which is "opaque" to UV and visible radiation shall have an absorption of photons at wavelengths between 200 and 800 nm as measured by a spectrophotometer with an integration sphere detector through a film of thickness 10 μm of less than 10%. This definition is that of test ASTM D 1238, incorporated by reference.

The SEPAP 12-24 uses an enclosure for artificial aging with a high pressure mercury lamp (MA 400) filtered by borosilicate.

The International Organization for Standardization (ISO) test 1133, "Plastics—Determination of the melt flow rate of thermoplastics" is incorporated by reference.

The Dynstat method of the Centre d'Etude des Matieres Plastiques, published in Industrie des Plastiques Modernes, Vol. 5, No. 4, is incorporated by reference.

I claim:

1. An article with a continuous structure, comprising at least three layers, wherein
    an outermost layer consisting essentially of PVDF;
    a middle layer consisting of PVDF homopolymer and/or PVDF copolymer containing at least 70% by weight of residue of vinylidene fluoride molecules and at least one agent selected from the group consisting of fillers, pigments, UV-absorbing agents, UV-stabilizing agents and plasticizers; and
    an inner layer comprises a composition which allows adhesion of PVDF to a PVDF-incompatible thermoplastic polymer
wherein the outermost layer has a light transmission such that the absorption of photons of wavelength 800 nm on a 50 μm film is less than 70% and the middle layer has a light transmission such that the absorption of photons of wavelengths between 200 and 800 nm on a 50 μm film is greater than 90%.

2. The article according to claim 1, wherein
    the outermost layer has a thickness between 10 and 300 μm;
    the middle layer has a thickness between 10 and 300 μm; and
    the inner layer has a thickness between 10 and 200 μm.

3. The article according to claim 1, comprising a pearlescent pigment.

4. The article according to claim 1, comprising zinc oxide.

5. The article according to claim 1, which further comprise an innermost layer comprising the PVDF-incompatible polymer which is selected from the group consisting of the chloro vinyl polymers, the styrene polymers, the polycarbonates, the polyurethanes, the grafted styrene-acrylonitrile-acrylic elastomer copolymers, the acrylonitrile-butadiene-styrene copolymers, the polyamides, the polyether (block) amides, the polyolefins, the polyphenylene ethers, alloys of polyphenylene ethers with polysterene, and alloys of polyphenylene ethers with polyamide.

6. The article according to claim 5, wherein the article is formed by means of hot-pressing.

7. The article of claim 5 made by one-stage coextrusion of the triple layer with the PVDF-incompatible polymer.

8. The article of claim 5 further comprising at least one material selected from the group consisting of metallic substrates, wood-based substrates, and fabrics, wherein the layers are hot-pressed with the material and the innermost layer is bound to the material.

9. The article according to claim 1, wherein the article is obtain by coextrusion of the materials constituting the outermost, middle and inner layers.

10. The article according to claim 1 further comprising at least one material selected from the group consisting of metallic substrates, wood-based substrates, and fabrics, wherein the inner layer is bound to the material.

11. The article according to claim 1, wherein the outermost layer consists essentially of a first PVDF homopolymer, the middle layer consists of a second PVDF homopolymer and the agent, and the second PVDF homopolymer has bigger fluidity than the first PVDF homopolymer.

12. An article with a continuous structure, comprising at least three layers, wherein an outermost layer consisting essentially of PVDF;

a middle layer consisting of PVDF homopolymer and at least one agent selected from the group consisting of fillers, pigments, UV-absorbing agents, UV-stabilizing agents and plasticizers; and an inner layer comprises a composition which allows adhesion of PVDF to a PVDF-incompatible thermoplastic polymer.

13. The article according to claim 12, wherein the middle layer contains pearlescent pigment of at least about 2% by weight.

14. The article according to claim 12, wherein the middle layer contains zinc oxide of at least about 15% by weight.

15. The article according to claim 12, which further comprise an innermost layer comprising the PVDF-incompatible polymer which is selected from the group consisting of the chloro vinyl polymers, the styrene polymers, the polycarbonates, the polyurethanes, the grafted styrene-acrylonitrile-acrylic elastomer copolymers, the acrylonitrile-butadiene-styrene copolymers, the polyamides, the polyether (block) amides, the polyolefins, the polyphenylene ethers, alloys of polyphenylene ethers with polystyrene, and alloys of polyphenylene ethers with polyamide.

16. The article according to claim 12, wherein the outermost layer has a thickness between 10 and 300 $\mu$m;

the middle layer has a thickness between 10 and 300 $\mu$m; and the inner layer has a thickness between 10 and 200 $\mu$m.

17. An article with a continuous structure, comprising at least three layers, wherein an outermost layer consisting essentially of PVDF;

a middle layer consisting of a PVDF copolymer containing at least 70% by weight of residue of vinylidene fluoride molecules and at least one agent selected from the group consisting of fillers, pigments, UV-absorbing agents, UV-stabilizing agents and plasticizers; and an inner layer comprises a composition which allows adhesion of PVDF to a PVDF-incompatible thermoplastic polymer.

* * * * *